United States Patent [19]

Orensten et al.

[11] 4,077,877
[45] * Mar. 7, 1978

[54] WATER FILTRATION METHOD

[76] Inventors: Henry E. Orensten; Vivian C. Orensten, both of 8724 Westmoreland La., St. Louis Park, Minn. 55426

[*] Notice: The portion of the term of this patent subsequent to May 18, 1993, has been disclaimed.

[21] Appl. No.: 677,697

[22] Filed: Apr. 16, 1976

Related U.S. Application Data

[63] Continuation-in-part of Ser. No. 613,327, Sep. 15, 1975, abandoned.

[51] Int. Cl.² .............................................. E04H 3/20
[52] U.S. Cl. .............................. 210/17; 210/DIG. 28; 210/169
[58] Field of Search ............ 210/169, 220, 497, 497.1, 210/11, 2, 17; 261/123, 122

[56] References Cited

U.S. PATENT DOCUMENTS

| | | | |
|---|---|---|---|
| 2,817,689 | 12/1957 | White | 261/123 |
| 3,292,792 | 12/1966 | Falkenberg et al. | 210/169 X |
| 3,312,349 | 4/1967 | Rosaen | 210/497 X |
| 3,334,752 | 8/1967 | Matravers | 210/497.1 |
| 3,356,226 | 12/1967 | Miller, Jr. et al. | 210/497.1 |
| 3,692,186 | 9/1972 | Marzocchi | 210/497.1 |
| 3,785,494 | 1/1974 | Sama | 210/169 |
| 3,941,862 | 3/1976 | Price et al. | 261/122 |
| 3,945,923 | 3/1976 | Rogers et al. | 210/497 X |
| 3,957,634 | 5/1976 | Orensten et al. | 210/11 |

*Primary Examiner*—Theodore A. Granger
*Attorney, Agent, or Firm*—Merchant, Gould, Smith, Edell, Welter & Schmidt

[57] ABSTRACT

Efficient biological and mechanical and/or chemical filtration or purification of the water in an aquatic life support system is achieved with a submerged device through which a high water flow rate is induced by a generally vertical flow of air through the hollow core of one or a plurality of filtration elements. Each filtration element accommodates a high flow rate (e.g. more than 50 gallons per hour) and can contain a viable colony of nitrifying bacteria. The preferred filtration device comprises a base with a plurality of air inlets and air passageways or conduits to the aforementioned hollow core of each filtration element. The base supports and positions the filtration elements. Increased flow rates can be achieved by affixing a hollow tube or conduit to the upper end of the aforementioned hollow core of a filtration element.

2 Claims, 6 Drawing Figures

WATER FILTRATION METHOD

CROSS REFERENCE TO RELATED APPLICATIONS

This application is a continuation-in-part of our co-pending application Ser. No. 613,327 filed Sept. 15, 1975, now abandoned.

U.S. patent application Ser. No. 471,319, filed May 20, 1974 (Orensten et al), now U.S. Pat. No. 3,957,634 contains a disclosure regarding integral filtration elements which are provided with living colonies of nitrifying microorganisms.

FIELD OF THE INVENTION

This invention relates to a method for treating (e.g. filtering or purifying) the water in an aquatic life-support system, e.g. an aquarium (including home or hobby aquariums) or a holding tank or stock tank for fish, crustaceans, invertebrates, and other fresh water or marine aquatic life. An aspect of this invention relates to preventing or controlling the build-up of toxic substances in the water of the aquatic life support system, e.g. ammonia resulting from the action of heterotrophic bacteria on nitrogenous substances such as uneaten proteinaceous fish food, fish excrement, and other sources of proteins and amino acids; and the ammonia respired or excreted by aquatic animals. Another aspect of this invention relates to a biologically active filtration device, acting in dual purpose as a mechanical (and/or chemical) filter, for either fresh water or marine-type aquariums. Still another aspect of this invention relates to a filtration device of the air-induction type, wherein an air pump supplies a flow of the air to the device, thus inducing a flow of water through filtration elements. Still another aspect of this invention relates to an air-induction filtration device suitable for submersion under the surface of the water in the aquatic life support system. Still another aspect of this invention relates to an air lift conduit affixed to the upper end of the hollow core of each filtration element.

DESCRIPTION OF THE PRIOR ART

An aquarium or the like is a miniature ecosystem. The aquatic life within this ecosystem produce metabolites and wastes, consume oxygen, and slowly poison their own environment. Some form of water purification or filtration is eventually needed to reduce mortality and disease.

There are several fundamentally different approaches to aquarium purification or filtration. In one approach, which relies heavily on bacterial action, water in the aquarium tank (or holding tank or stock tank, as the case may be) circulates through a filter bed or other filtration device located inside the tank. In another approach, the filter medium or device is external to the tank, and a pump, siphon, or the like, draws water from the tank, so that it can be passed through the external filter and returned to the tank in substantially purified form. In the first (submerged filter) approach, chemical and/or mechanical filtration means can be combined with the bacterial action in the filtration process.

When the filter medium is submerged within the water in the tank, it is not absolutely necessary to use a powerful water pump. Relatively inexpensive "air-induction" pumps can be used. These pumps force a stream of air into the tank, and the air stream induces a flow of water through the filtration device submerged in the tank. Although air induction is not as efficient or powerful as, for example, an impeller action exerted directly upon the water, substantial flow rates can be achieved with this air-induction technique, e.g. flow rates in excess of 30 gallons per hour, using an air pump with 3 watts of power.

As noted previously, the filtration process which takes place in the tank can be mechanical, chemical, biological, or some combination of any of these. The combination of biological filtration with other means of filtration appears to be the most effective and the least disturbing to the aquatic ecosystem, since it takes advantage of the so-called nitrogen cycle to convert toxic metabolites and wastes in the water (e.g. ammonia) to relatively harmless or relatively less harmful substances (e.g. nitrites and ultimately to nitrates or even fixed nitrogen). For a detailed discussion of the nitrogen cycle, see Stephen H. Spotte, *Fish and Invertebrate Culture*, Wiley-InterScience, New York, N.Y. 1970, pp 3–21. Pages 9–13 of this work by Spotte contain a detailed discussion of air lifts and airlift conduits.

It is well known that organic matter in the aquarium water can build up in a filtration device (e.g. in the so-called "under-gravel" filter, which includes a bed of gravel serving as the filtration medium) and provide a nutrient medium for microorganisms (bacteria, algae, etc.) which are capable of reducing levels of toxicity in the water. In another context, it has been suggested that a "dirty" filter (which contains a possible nutrient medium for bacteria) should be retained in a filtration system as long as is reasonably possible, e.g. by replacing only part of the filter material when it becomes clogged and begins to resist fluid flow too strongly. See *Tropical Fish Hobbyist*, VOl XX, September 1971, pp 85–88. In actual practice, it has been found that the complete replacement or cleaning of a biological filter device can ring on a condition known as "new tank syndrome", i.e. increased mortality or disease in the aquatic life which is generally attributed to the temporary lack of sufficient biological water-purifying action. Furthermore, even a well-cultured biologically active filter element may not be adequate for marine tanks or crowded fresh water tanks.

One of the most convenient types of filter structures is the type where the filtration medium is arranged about a hollow longitudinal core. The filtration medium is provided with enough integrity (e.g. by a suitable forming process or by use of reinforcing devices or members) to be handled as a removable filtration element. One of the advantages of these integral, porous filtration elements is that the hollow core can be used to house a second filtration medium, e.g. a bed of elemental carbon particles or the like. The filtration medium can comprise cellulosic material, inorganic fibers, synthetic organic fibers, or the like. The fibers can be woven or non-woven. For an example of a filter medium which is a porous, physically solid unit with sufficient integrity to be handled as an integral cartridge or insert, see U.S. Pat. No. 3,313,421 (Falkenberg et al), issued Apr. 11, 1967. Unfortunately, it can be somewhat difficult to make full use of such integral filter cartridges in a biologically active air-induction system.

The following U.S. Patents are believed to illustrate the state of the art:

| Pat. No. | Patentee | Issue Date |
|---|---|---|
| 3,149,608 | Murphy | September 22, 1964 |

-continued

| Pat. No. | Patentee | Issue Date |
|---|---|---|
| 3,232,271 | De Jose et al | February 1, 1966 |
| 3,276,428 | Burch | October 4, 1966 |
| 3,292,579 | Buchanan | December 20, 1966 |
| 3,313,421 | Falkenberg et al | April 11, 1967 |
| 3,487,440 | Newsteder | December 30, 1969 |
| 3,557,753 | Dantoni | January 26, 1971 |

Of the foregoing references, the Newsteder patent is believed to be most pertinent to the concepts of this invention.

SUMMARY OF THE INVENTION

It has now been discovered that an unusually efficient biological filtering action for both fresh water and marine aquariums can be obtained with an air-induction filtration system in which the air stream, after passing through a diffuser element or the like, is introduced at the bottom of the hollow axial core of an integral porous submerged filter element, thus causing water to flow through the filter element from its exposed outer surface to the hollow inner core. In order to provide this improved filtering action, it is particularly important that the porous integral filter elements be capable of permitting an unusually high flow rate through the pores or interstices of the filter medium, even when the filter medium has become partially clogged due to the deposition or entrapment of detritus, fecal matter, etc., present in the water of the aquatic life support system. For example, the surface area and porosity of the filter element should be sufficient to permit a flow rate well in excess of 40 gallons per hour (e.g. 50-100 gallons per hour), with an air pump rated at 1.5 to 3 watts of power; when the filter element is fresh and unclogged, and well over 25 gallons per hour when the filter element contains a significant amount of sediment (e.g. detritus). In operation, a mass of tiny air bubbles passes up the hollow axial core of the filter element drawing this vast volume of water through the filtration medium and up along with the flow of bubbles. Although high flow rates are preferably achieved with a minimum of power, high wattages (e.g. 50 watts or more) can be used, if desired.

It has also been discovered that the optimum filtering effect can be achieved with a plurality of substantially identical filtration elements. Each filtration element is then provided with an air stream and a diffusing element at the bottom of its hollow axial core. In one embodiment of this concept, additional filtering action can be provided with other mechanical and/or chemical filtering devices, e.g. a mass of elemental carbon particles (such as activated charcoal particles) inserted within one or more hollow axial cores.

It has also been discovered that increased flow rates can be obtained by affixing an air lift conduit of a certain length to the upper end of the hollow core of a filtration element, preferably each filtration element if there is more than one. For example, the use of a relatively short air lift conduit (e.g. from about 1 to 10 inches in length or about 2.5-25 cm) was found to increase the flow rate by about 25 to 75% over the flow rate obtained using the same system without the air lift conduit, provided the entire air lift conduit is submerged. Presently available data indicate that the optimum air lift conduit length for every air pressure and water flow rate is such that the upper end of the conduit is in closely spaced relationship to the surface of the body of water in the aquarium. The increased flow rates obtained with this embodiment serve to increase the level of the water purification or filtration action of the system and thereby improve the health of the aquatic life within the ecosystem.

Still another discovery is that water filtration devices of this invention are useful in combination with other water purification systems, e.g. the systems disclosed in U.S. application Ser. No. 471,319, filed May 20, 1974 and U.S. Pat. No. 3,722,685.

In any of these embodiments, "new tank symdrome" can be reduced or avoided by pre-culturing of one or more filtration elements with living colonies of nitrifying microorganisms. When the filtration device contains a plurality of porous integral filtration elements, it is relatively easy to maintain at least one fully cultured filter element in the tank at all times — and this cultured filter element can be one which was originally fresh (or "clean") and was subsequently cultured while in service in the tank.

DETAILED DESCRIPTION

Figure 1:
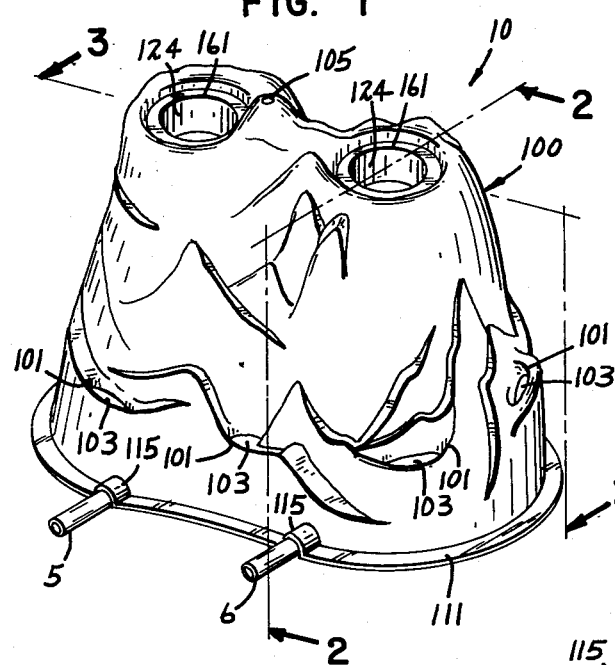
FIG. 1 is a perspective view of a fully assembled filtration device of this invention, including a decorative cover means which camouflages the internal workings of the device.

This invention seeks to maximize the biological action of nitrifying microorganisms such as algae and/or autotrophic bacteria such as Nitrosomonas sp., Nitrobacter sp., and/or heterotrophic bacteria or the like. In use, the aquatic life support system and the filtration system are preferably operated to favor establishment and maintenance of autotrophic bacterial colonies; for example, sudden changes in pH or salinity or hardness or soluble carbonate concentration should be minimized or avoided and antibiotic, bacteriostatic, and bacteriocidal treatments should generally be avoided completely. High flow rates, however, seem to have little, if any, adverse effect upon colonies of autotrophic bacteria in the biological filter elements.

In one embodiment of this invention, a plurality of integral porous filtration elements are included in the filtration device. As pointed out previously, this facilitates the continuous maintenance of a living colony of nitrifying microorganisms in the tank. It is not necessary that any of the filtration elements be pre-cultured, provided that a sufficient "run-in" period is used. During the "run-in" period, the fish population should be kept to a minimum. Even a small fish population will excrete sufficient wastes to provide a nutrient medium in the filtration elements and, as a result, the desired bacterial culture. Compared to "under gravel" filtration systems, aquarium system maintenance can be greatly simplified and reduced. For example, frequency of water changes and cleaning of the system (e.g. gravel beds) can be reduced. Ordinarily, it is sufficient to periodically replace one of the clogged or dirty filtration elements, leaving the other element in place for continued maintenance of biological action. This alternating replacement of filter elements can continue more or less indefinitely, thus maintaining a high flow rate as well as a high level of biological filtering action.

In this invention, the advantages of an external filter can be combined with the advantages of a submerged filter, while minimizing the disadvantages of both. The integral filter elements of this invention are, in effect, sealed in place in the filtration device to minimize bypassing of the filtration medium. Matting or compressing of a particulate or fibrous filter bed can be avoided. Stagnant areas in the aquarium tank are minimized. If a decorative gravel bed or the like is included in the tank, such bed can be arranged to provide a secondary filtering or purifying action with a minimum of risk that stagnant areas will be introduced.

Among the features of the invention which are believed to contribute to the attainment of these advantages are the peripheral water flow inducing effect created by the flow of air up through a hollow core of an integral filter element and the surprisingly high flow rates, e.g. more than 135 gallons per hour for the preferred embodiment operating at peak efficiency. Considerably higher flow rates can be obtained when the air lift conduit is arranged in register with the top of the hollow core of the filter element, as mentioned previously. To accommodate such high flow rates, an unusually porous filter element structure is preferred, which will be described in detail subsequently.

Figure 2:
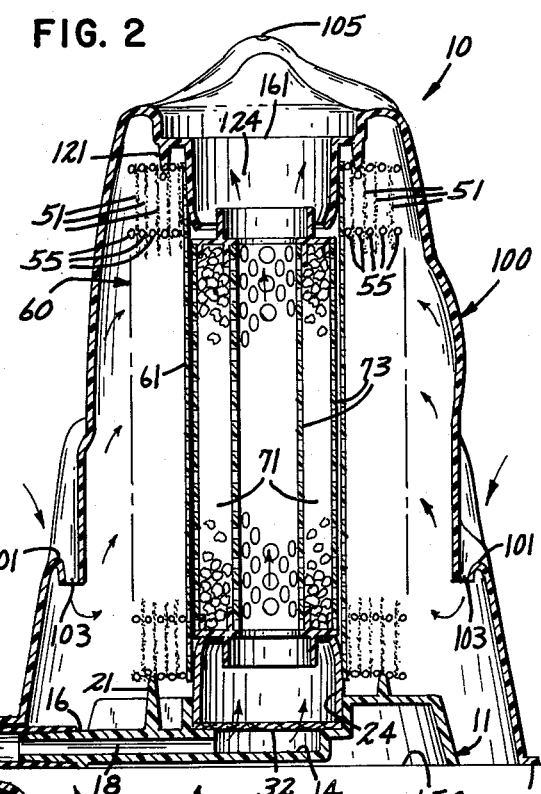
FIG. 2 is a sectional view taken along lines 2—2 of FIG. 1.
Figure 3:
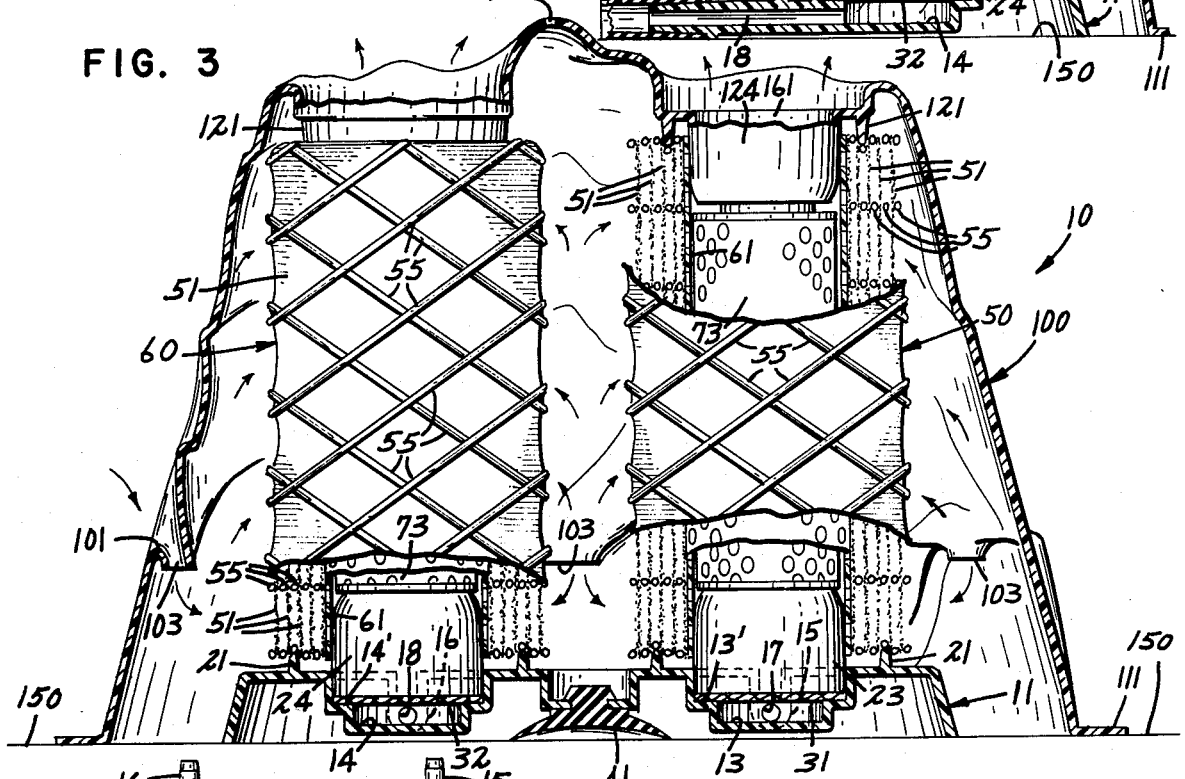
FIG. 3 is a sectional view taken along line 3—3 of FIG. 1, with parts broken way to show details of the structure of the filtration elements.
Figure 4:
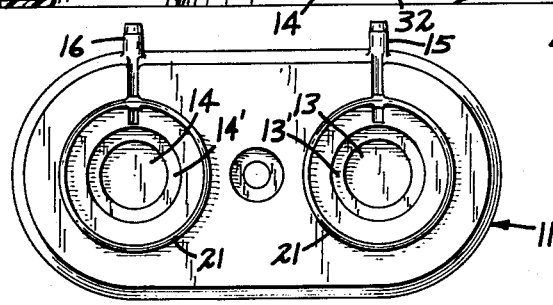
FIG. 4 is a top plan view of the base or support member shown in FIGS. 2-3.

Turning now to a detailed description of the drawing, FIG. 1 illustrates the complete filtration device 10 with the decorative cover means 100 in place, such that the only internal workings of the filtration device which can be seen are the air hoses 5 and 6 which are connected to air inlets 15 and 16 (FIG. 4) to convey air streams from a suitable air pump means (not shown). For convenience of illustration, only portions of hoses 5 and 6 are shown. Cover means 100 includes circular openings 161 at the top. For decorative purposes, openings 161 are intended to simulate the mouths of a twin volcano. Openings 161 are in register with the hollow axial cores in filtration elements 50 and 60, the hollow cores being defined by hollow axially disposed elements 61 (FIGS. 2 and 3). Thus, the air which is introduced via hoses 5 and 6 through inlet conduits 15 and 16 passes through these hollow cores and emerges from openings 161. This air flow draws water through openings 103 in the molded ridges 101 of cover 100. The water drawn through openings 103 flows through the filtration elements 50 and 60, i.e. from the exposed surfaces of elements 50 and 60 through to the hollow cores defined by axial cylindrical elements 61. The water flow, when it reaches the hollow axial cores is substantially purified and is returned to the main body of water in the aquatic life support system by flowing out through openings 161 along with the aforementioned flow of air. In the preferred embodiment of cover means 100 shown in FIGS. 1-3, a flange means 111 extends outward from the lower periphery of the cover. The flange is provided with U-shaped openings 115 to accommodate air inlets 15 and 16 (FIG. 4). Since flange 111 rests upon the floor 150 of the aquarium tank (FIG. 3), sand or gravel or other decorative particles (not shown) can be heaped up around the bottom of cover 100, covering flange 111 and helping to hold cover 100 in place. An additional aid for holding cover 100 in place is opening 105 on the top surface of cover 100. This opening can serve as an exhaust for any air trapped under the central high point of this surface of the cover. Extending downward from openings 161 are ring-like or tubular locators or fasteners, i.e. positioners 124, which are constructed and arranged to have a frictional engagement action. This frictional engagement helps to properly position cover 100 as well as to hold it in place.

It should be noted that, since relatively low density materials such as the polyolefins can be used in the fabrication of one or more elements of the filtration device (e.g. polyolefin fibers can be used in the filtration elements 50 and 60), the entire filtration device 10 may have a tendency to float to the surface of the water in which it is submerged. In addition to the anchoring action provided by particles (not shown) heaped up on flange 111, a very secure attachment to the floor 150 of the aquarium can be achieved with an additional anchoring means, in this case, suction cup 41 (FIG. 3).

The principal functional elements of the filtration device 10 which are housed by cover 100 are the base or support member 11 and the filtration elements 50 and 60, supported and positioned by base member 11. The base member 11 includes an air directing and diffusing system comprising air inlet 15 and 16, conduits 17 and 18, and recess means 13 and 14. These recesses define all but the top surface of an air chamber. The top surfaces of the two air chambers are provided by removable air diffuser elements 31 and 32. These elements are porous, sheet-like disc members preferably fabricated from synthetic organic polymeric materials (e.g. polyolefins such as polypropylene). These diffuser elements 31 and 32 serve substantially the same function as the familiar "air stone", e.g. element 72 in FIG. 2 of the aforementioned Newsteder U.S. Pat. No. 3,487,440, but have several advantages over conventional air stones. The porous discs 31 and 32 tend to be biologically inert and resistant to clogging. Once clogged, they are easily replaced. Furthermore, they provide efficient diffuser action while occupying a tiny volume, thus simplifying the design of the device. The diffuser elements break up the flow of air passing through inlets 15 and 16 and airways 17 and 18 thereof into a mass of tiny air bubbles which passes up the hollow axial cores of filtration elements 50 and 60.

Diffuser elements 31 and 32 are interposed between, first, shoulders 13' and 14' of the walls of recesses 13 and 14, and second, the bottom end of positioners 23 and 24, which are provided with frictional engagement features similar to positioners 124. Since the positioners 23 and 24 have a circular cross-section and annular ends, the lower annular ends of positioners 23 and 24 serve as retaining rings for diffuser elements 31 and 32. The upper ends of positioners 23 and 24 are arranged to provide for frictional engagement with the hollow cylindrical core elements 61. Thus, positioners 23 and 24 serve a dual function; they retain diffusers 31 and 32 in place while helping to properly position and hold filter elements 50 and 60. A peripheral sealing effect is provided by circular flanges 21, which are integral with base member 11, and 121, which are integral with cover 100. The positioners 23 and 24, on the other hand, are removable to permit easy replacement of diffusers 31 and 32.

Filter elements 50 and 60 are cylindrical and have hollow longitudinal, axial cores; the hollow cores being defined by hollow cylindrical elements 61. The filtration medium of filter elements 50 and 60 consists essentially of a plurality of layers of synthetic organic polymeric fibers (e.g. fibers of a polyolefin such as polypropylene). Natural organic fibers (e.g. of the cellulosic or proteinaceous type) which can be biodegradable, are generally not used. The sediment which becomes trapped in the filtration medium during the use of the filtration device 10 is ordinarily adequate by itself to provide a nutrient medium for nitrifying microorganisms, and it is ordinarily unnecessary to include biodegradable fibers in the filtration medium.

The fibrous structure in the filtration medium 51 can be woven or non-woven, but is preferably non-woven. In either event, interstices in the fibrous structure provide the pores of the filter medium. The porous structure is sufficiently interconnected to provide water permeability from the outer surface of the filters 50 and 60 to the inner cores defined by serrated cylindrical elements 61. The pores extending from the outer surface to the inner core, regardless of whether they are tortuous or generally linear, can be assumed to have a width-like dimension analogous to the diameter of a cylinder. Thus, in the context of this invention, the term "pore size" refers to the diameter or width of these generally cylindrical or tortuous pores. In actual practice, it may be difficult to assign an accurate measurement to the "pore size" of filter elements 50 and 60. It is important that the pore size be relatively large, so that each filter element, when fresh and free from trapped sediment, will permit a water flow through the filtration medium of at least about 50 gallons per hour, preferably at least 60 or 70 gallons per hour. Thus, two filter elements, when fresh, can provide a flow of filtered water out of openings 151 which exceeds 100 gallons per hour or even 135 gallons per hour*. Commercially available air pumps can provide sufficient air flow into inlets 15 and 16 to induce this high flow rate. For example, a suitable type of air pump has a high efficiency dual output design with about 3 watts of power or more. Surprisingly, the high flow rate does not disturb the fish in the tank.
*About 380 L/hr or even 510 L./hr.

Regardless of the manner in which the "pore size" of filter elements 50 and 60 is measured, these filter elements are functionally equivalent to filters having a pore size well in excess of 10 microns, e.g. 20–1,000 microns, less than about 500 microns being generally preferred. To maintain the openness and high porosity of the filtration medium, fibrous layers 51 are interposed between windings 55 of reinforcing strands or bands. These windings 55 preferably comprise multifilament strands similar in structure to multifilament yarn or twine.

Figure 6:
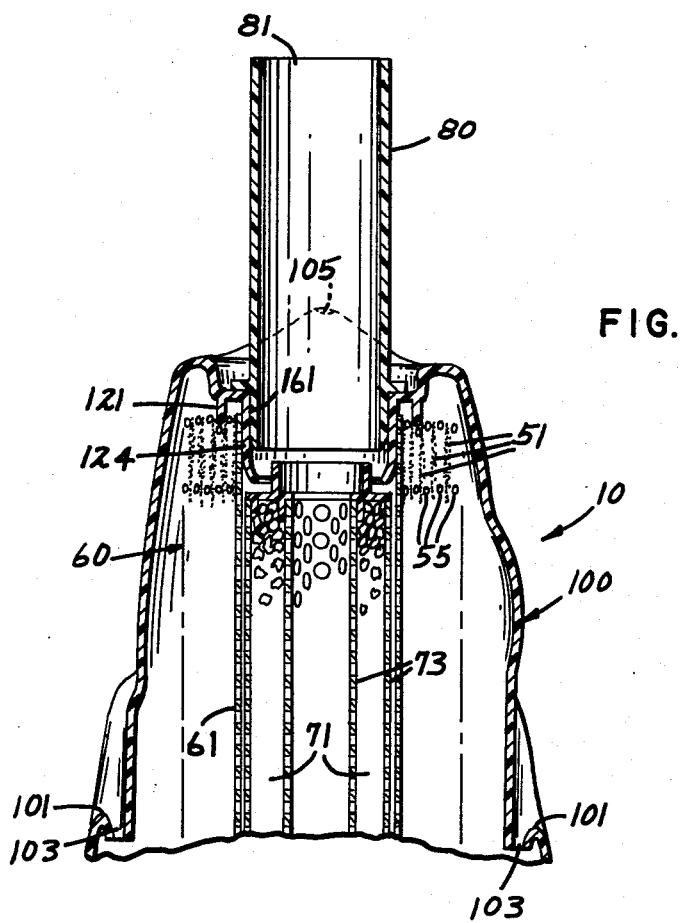
FIG. 6 is a fragmentary view showing the same device as shown in FIG. 2, but with the addition of the air lift conduit.

Although a high flow rate is achieved with the system as shown in FIGS. 1–3, the preferred embodiment of this invention includes air lift conduit 80 (FIG. 6) which serves to increase the flow rate as previously mentioned. Air lift conduit 80 fits into circular opening 161 and frictionally engages with the interior of positioner 124, thereby extending the hollow longitudinal, axial core of hollow cylindrical element 61 and causing the purified water to be returned to the main body of water in the aquatic life support system by flowing through opening 81 along with the flow of air. In the preferred embodiment are lift conduits are affixed in the circular openings above each filtration element.

Although the air lift conduit feature of this invention is not bound by any theory it is believed that for maximum efficiency of operation, the flow of water and air bubbles through the hollow core of the filter is preferably channeled upward into a non-porous conduit which speeds up the flow rate of the mass of water and dispersed air bubbles, resulting in faster drawing of water through the filter element into the hollow core.

Although nitrifying microorganisms can be very effective in converting toxic dissolved gases such as ammonia into relatively harmless nitrate salts or fixed nitrogen, they may have little or no effect upon an increasing concentration of certain other gases such as carbon dioxide. As is known in the aquarium art, an increasing concentration of carbon dioxide can shift the pH downward to the point where the acidity of the water can be a hazard to certain species of aquatic life, e.g. certain marine fish which are accustomed to a mildly alkaline pH. It is also known in the art that particulate elemental carbon (e.g. activated charcoal) can help to lower the carbon dioxide level in the aquarium water (e.g. by removing carbon dioxide-forming compounds). This technique can be advantageously used in the context of this invention. Thus, in the preferred embodiment shown in FIGS. 2 and 6, an activated elemental carbon bed 71, which serves as an additional filtration medium, is enclosed within a hollow cylindrical foraminous retaining means 73 which is in turn enclosed within the hollow axial core of filter element 60. A second carbon filtration medium can be enclosed within a hollow core of filtration element 50, if desired, though this generally appears to be unnecessary. The bed of carbon (i.e. some form of elemental carbon) is made easily insertable and removable by means of the foraminous retaining means 73.

As will be apparent from FIGS. 2 and 4, the reinforcing windings 55 provide filtration elements 50 and 60 with a high degree of structural integrity. These filter elements can be handled very much like any other replaceable parts. It must be remembered, however, that these elements 50 and 60, unless they are pre-cultured (e.g. by soaking in a nutrient medium followed by innoculation) are less effective when fresh. After a period of use, however, proper culturing of the filter elements appears to be an inherent feature of this invention.

The structure of removable and replaceable filter elements 50 and 60 is based upon commercially available filter elements such as the "Microwind" (trade designation of the Cuno Engineering Division of AMF). Alternatively, polyolefin multi-filaments wound on a rigid hollow core element and having an effective pore size above 10 microns, preferably at least 50 microns can be used (e.g. the "Precision" filters may be Precision Engineering Company).

One of the advantages of the structure of filtration device 10 is that it is suitable for fabrication from a variety of inexpensive and easily shaped materials which are biologically inert or biologically compatible with the water purification process taking place in device 10. In the preferred embodiment of this invention, cover 100, base member 11, air inlet means 15 and 16, conduit means 17 and 18, positioners 23 and 24, cylindrical elements 61 and air lift conduit means 80 are all formed or molded from plastics (i.e. synthetic thermoset or thermoplastic resins), the preferred plastics being thermoplastic resins of the nitrile, sytrene, olefin, or di-olefin families or copolymers (including terpolymers, etc.) thereof, e.g. acrylonitrile-butadiene-styrene.

Figure 5:
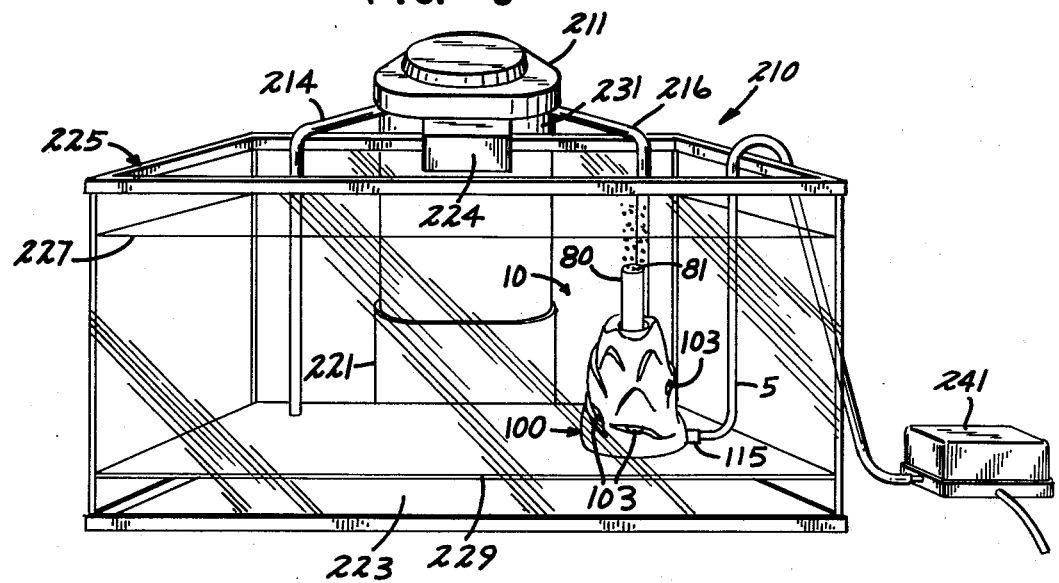
FIG. 5 is a perspective view of a complete aquatic life support system including the fully assembled filtration device of this invention, which includes both a decorative cover means for camouflaging the internal workings of the device and an air lift conduit, in combination with the external filtration system described in U.S. patent application Ser. No. 471,319, filed May 20, 1974.

FIG. 5 illustrates a complete aquatic life support system 210 comprised of an aquatic life support tank 225 containing water 227 (which can be fresh water, sea water, simulated sea water, or the like), an external filter system 211 [such as described in U.S. patent application Ser. No. 471,319, filed May 20, 1974 (Orensten et al)], and a filtration device 10 of this invention, which is attached to flow control plate 229. The tank 225 in FIG. 5 is divided into an upper chamber and a lower chamber 223 by the aforementioned flow control plate 229, as in U.S. Pat. No. 3,722,685. External filter system 211 is comprised of body 231 of the filter housing, a motor housing 221, a hanger means 224 for engaging a side wall of tank 225; conduit 214 serving as an inlet means and conduit 216 serving as an outlet means. As described in detail in the aforementioned U.S. Pat. No. 3,722,685, contaminated water is drawn up through conduit 214 from below control plate 229, and filtered and purified water is returned to the lower chamber 223 under flow control plate 229 via conduit 216. Filtration device 10 includes air lift conduit means 80, air hose 5 and is supplied with air by air pump 241 through air hose 5. Filtration device 10 can be used as a "back-up" system for external filter system 211, and to increase the filtration capacity of aquatic life support system 210, and to eliminate "new tank syndrome" by providing aquatic life support system 210 with a fully cultured filter element when cultured filter elements in external filter system 211 are replaced with fresh, uncultured elements.

OPERATION OF THE DEVICE

In operation, an air pump (not shown) forces air through hoses or tubes or conduits 5 and 6 to air inlets 15 and 16. Air inlets 15 and 16, along with air conduits 17 and 18 and recesses 13 and 14 cooperate to provide an air directing means, the purpose of which is to direct the air stream upward to the hollow axial cores of filter elements 15 and 16 through diffuser elements 31 and 32, thus inducing a flow of water through openings 103, then through the filtration medium 51 of each filtration element, and then into the hollow cores defined by cylindrical elements 61. The bacterial cultures which build up in the filtration medium 51 convert toxic substances such as ammonia to relatively less harmful materials such as nitrites, nitrates, or fixed nitrogen. The induced water flow, having been substantially freed of ammonia and the like is then further purified in its movement through activated elemental carbon bed 71, and the purified water emerging from opening 81 in air lift conduit 80 (FIG. 6) is biologically acceptable to even relatively concentrated fish populations in marine or fresh water aquariums (filtration device 10 is particularly well suited both for relatively small home or hobby aquariums ranging from about 5 gallon capacity up to about 50 or 60 gallon capacity and for larger aquariums as well). If desired, the possibility of excessive spray at the surface of the body of water in the aquarium can be reduced by placing a cap (not shown) over opening 81 and providing openings (also not shown) near the upper end of conduit 80. At some point in the operation of filtration device 10, either of filter elements 50 or 60 may become so clogged as to substantially reduce the overall water flow, e.g. the water flow may be reduced to 25 gallons per hour or less per filtration element or less than 50 gallons per hour for the two filter elements in combination. At this point in the operation of the device, it is preferable to replace one of the two filtration elements. Thus, even if a fresh, uncultured filter element is substituted for, say, filter element 50, filter element 60 will continue to provide biological filtering action, thus generally avoiding "new tank syndrome." Since the flow of air and water through the filtration device follows a parallel arrangement, the flow through filter elements 50 and 60 will generally be apportioned according to an inverse relationship to the fluid flow resistance of the respective filtration medium 51. The fresh filter elements will provide a high flow rate while the clogged or "dirty" element will provide biological filtering action. Although more water will flow through the fresh filter element, all of the water in the system will eventually be exposed to the beneficial biological action of the clogged or "dirty" filter through constant recirculation.

Although other flow arrangements can be used, the aforementioned parallel flow arrangement is preferred. Thus, for example, in the case of filter element 60, the flow is through inlet 16 and conduit 18 into recess 14, up through diffuser element 32, up through the open or hollow interior of positioner 24, up through the hollow axial core defined by cylindrical element 61 of element 60, and out through opening 161 or the opening 81 of air lift conduit 80 (FIG. 6) to return to the main body of water in the aquarium tank. It is preferred that openings 81 or 161 be submerged below the surface of the water in the aquarium tank.

The frictional engagement between positioners 124 and cylindrical elements 61 is similar to the frictional engagement between positioners 23 and 24 and cylindrical element 61. This frictional engagement greatly simplifies replacement of clogged filter elements. Cover 100 can be removed with an easy upward pull, and either filtration element 50 or 60 can be easily pulled free of its engagement with positioners 23 or 24. Yet, the positioners 23, 24 and 124 provide accurate and reliable positioning of the cover 100 and the filter elements 50 and 60.

What is claimed is:
1. A method for preventing the build-up of excessive ammonia levels in the water of an aquarium which utilizes a submersible air-induction water treating device and comprises the steps of:
    (a) submerging said device in the water of said aquarium; said device including a generally vertically extending parallel array of replaceable filtration elements, each said filtration element having a generally vertically extending core open at its upper and lower ends;
    (b) maintaining a flow of air through each of said cores of each of said filtration elements and thereby inducing water surrounding said water filtration device to flow in a circulating flow through said filtration elements and out said open upper ends of said cores;
    (c) depositing a microorganism growth medium and establishing a colony of living nitrifying microorganisms at least on a filtering surface of a plurality of filtration elements, thereby obtaining a plurality of cultured replaceable filtration elements;
    (d) replacing one of said cultured replaceable filtration elements with a first unclogged filtration element, and allowing nitrifying microorganisms and particulate material contained in said circulating flow to deposit at least on a filtering surface of said first unclogged filtration element and to establish a colony of living nitrifying microorganisms on said filtering surface of said first unclogged filter element;

(e) then replacing another of said at least two of said plurality of filtration elements with a second unclogged filtration element and allowing a colony of living nitrifying microorganisms to become established on a filtering surface of said second unclogged filtration element in the same manner as described in step (d);

(f) continuing to selectively replace filtration elements as described in steps (b) and (c) so that at least one of said replaceable filtration elements includes a colony of living nitrifying microorganisms at all times.

2. A method according to claim 1 wherein a said cultured replaceable filtration element is replaced with a fresh replaceable filtration element after said cultured replaceable filtration element has become sufficiently clogged to significantly reduce the rate of circulating flow of water through said device.

* * * * *